United States Patent
Baudouin et al.

(10) Patent No.: US 11,305,737 B2
(45) Date of Patent: Apr. 19, 2022

(54) CLEANING DEVICE INTENDED TO SPRAY AT LEAST ONE FLUID TOWARDS A SURFACE TO BE CLEANED OF A MOTOR VEHICLE, SUCH AS AN OPTICAL SURFACE OF A SENSOR OF AN OPTICAL DETECTION SYSTEM

(71) Applicant: Valeo Systèmes d'Essuyage, Le Mesnil Saint Denis (FR)

(72) Inventors: Maxime Baudouin, Issoire (FR); Giuseppe Grasso, Issoire (FR); Grégory Kolanowski, Issoire (FR); Thibaud Passerieux, Issoire (FR); Philippe Picot, Issoire (FR); Jordan Vieille, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 451 days.

(21) Appl. No.: 16/336,713

(22) PCT Filed: Jul. 18, 2017

(86) PCT No.: PCT/EP2017/068147
§ 371 (c)(1),
(2) Date: Mar. 26, 2019

(87) PCT Pub. No.: WO2018/059771
PCT Pub. Date: Apr. 5, 2018

(65) Prior Publication Data
US 2021/0276514 A1     Sep. 9, 2021

(30) Foreign Application Priority Data

Sep. 28, 2016 (FR) ...................................... 1659212

(51) Int. Cl.
*B60S 1/52* (2006.01)
*B05B 15/65* (2018.01)
(Continued)

(52) U.S. Cl.
CPC ................ *B60S 1/52* (2013.01); *B05B 15/65* (2018.02); *B08B 3/02* (2013.01); *G02B 27/0006* (2013.01)

(58) Field of Classification Search
None
See application file for complete search history.

(56) References Cited

U.S. PATENT DOCUMENTS

| 2011/0047742 A1* | 3/2011 | Kim | ...................... B60S 1/4009 15/250.32 |
| 2013/0036569 A1* | 2/2013 | Caillot | ...................... B60S 1/32 15/250.04 |

(Continued)

FOREIGN PATENT DOCUMENTS

| JP | S63269761 A | 11/1988 |
| WO | 2016074933 A1 | 5/2016 |
| WO | 2016116568 A1 | 7/2016 |

OTHER PUBLICATIONS

International Search Report and Written Opinion issued in corresponding International Patent Application No. PCT/EP2017/068147, dated Oct. 16, 2017 (9 pages).

*Primary Examiner* — Cristi J Tate-Sims
(74) *Attorney, Agent, or Firm* — Osha Bergman Watanabe & Burton LLP

(57) ABSTRACT

A cleaning device (100), intended to spray at least one fluid towards a surface to be cleaned of a motor vehicle, such as an optical surface of a sensor of an optical detection system, said cleaning device comprising at least one conveying body (1) and a delivery ramp (2) for delivering one or more cleaning and/or drying fluids, and attachment means (101)

(Continued)

Figure 3:
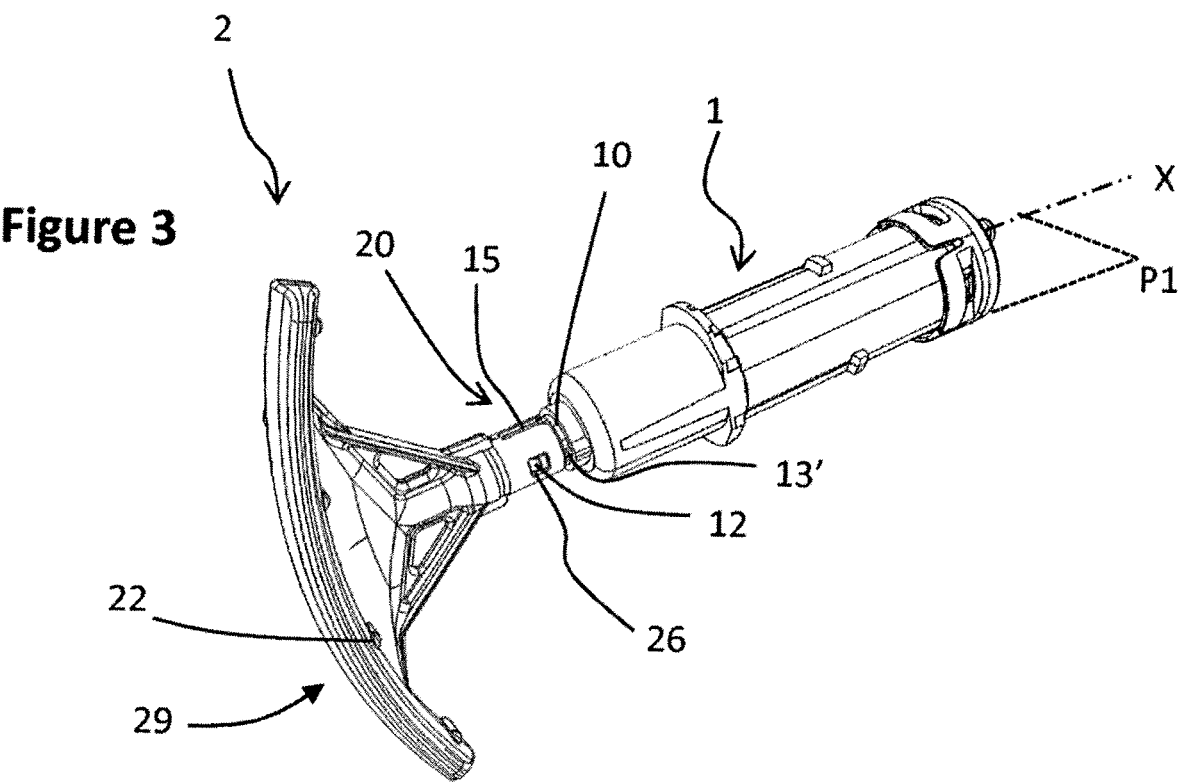

for attaching a connecting portion (20) of the delivery ramp (2) to an end of the conveying body (1). The attachment means (101) comprise an elastic interlocking assembly (102) and a foolproofing assembly (103) formed respectively by elements carried by the conveying body (1) and complementary elements.

13 Claims, 5 Drawing Sheets

(51) Int. Cl.
*B08B 3/02* (2006.01)
*G02B 27/00* (2006.01)

(56) References Cited

U.S. PATENT DOCUMENTS

2016/0103316 A1    4/2016  Rousseau
2017/0369039 A1*  12/2017  Rousseau ............. B60S 1/3404

\* cited by examiner

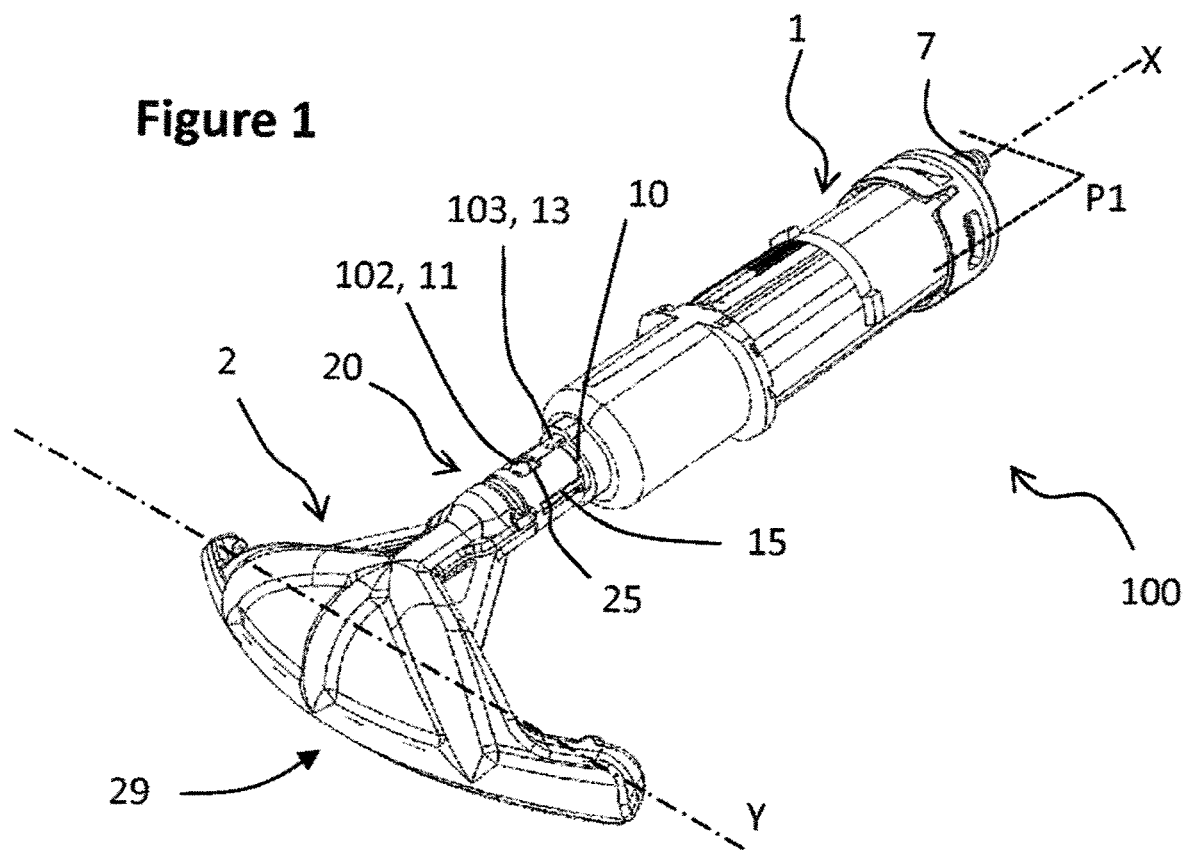
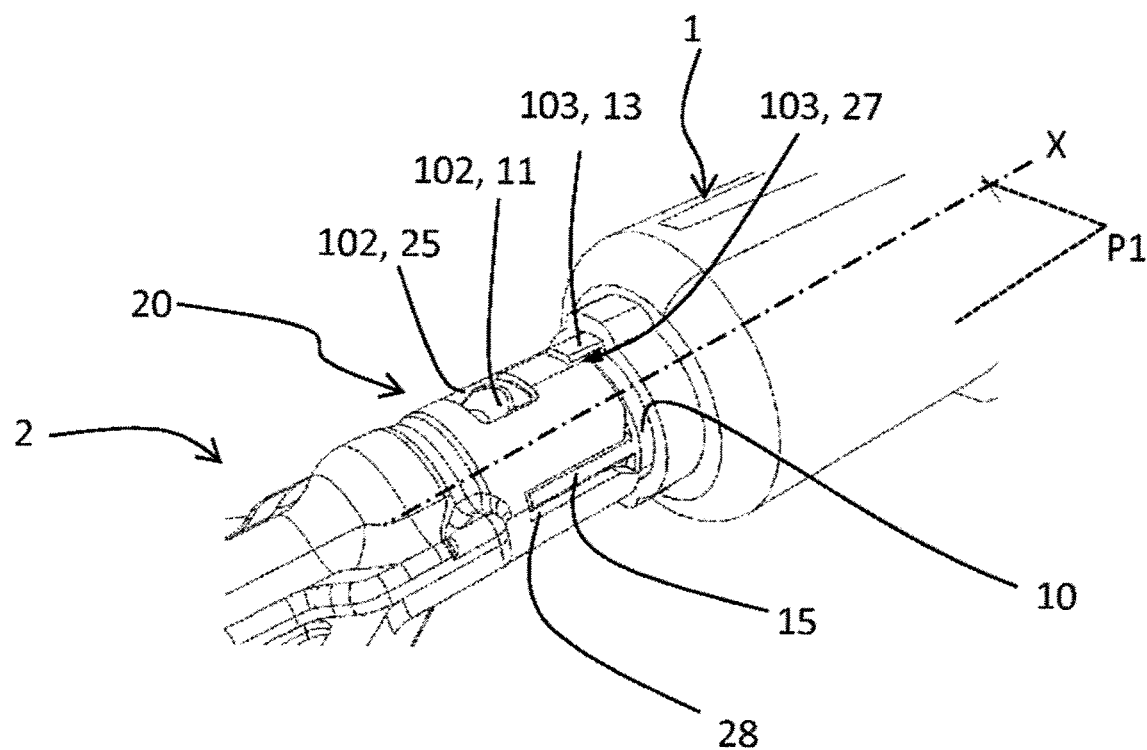

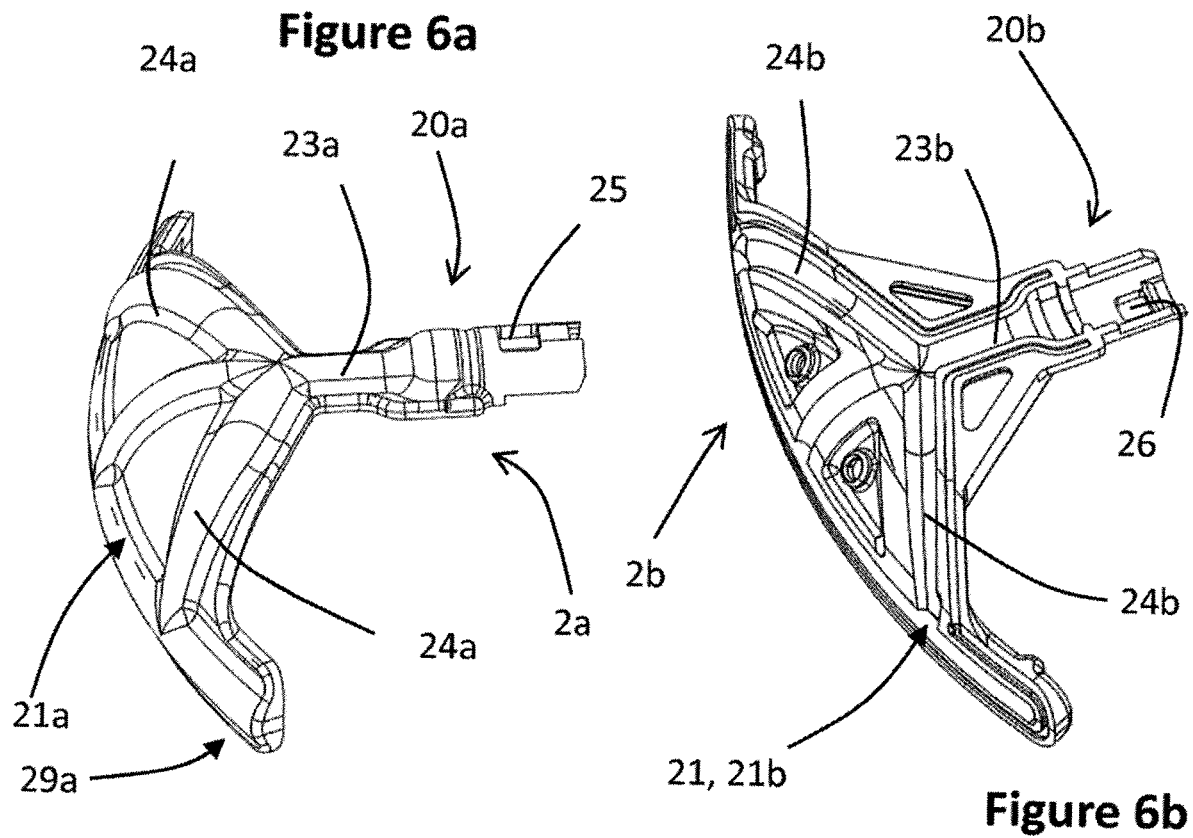
Figure 6a
Figure 6b
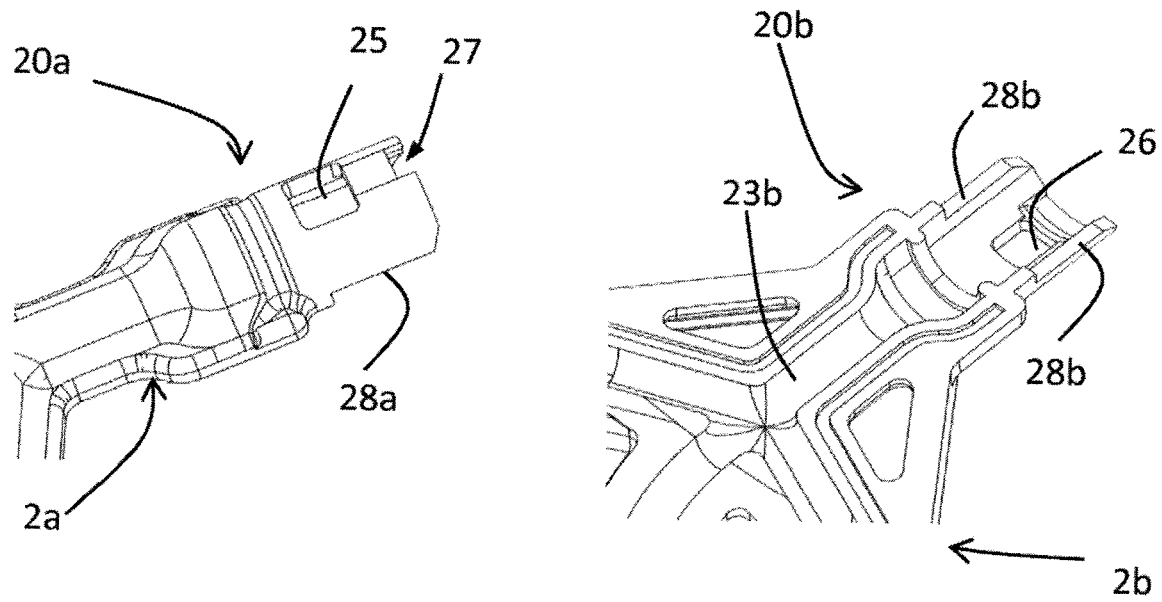
Figure 7a
Figure 7b

CLEANING DEVICE INTENDED TO SPRAY AT LEAST ONE FLUID TOWARDS A SURFACE TO BE CLEANED OF A MOTOR VEHICLE, SUCH AS AN OPTICAL SURFACE OF A SENSOR OF AN OPTICAL DETECTION SYSTEM

The present invention relates to the field of the detection systems intended for a motor vehicle, in particular for their application in driving assistance devices. It relates more particularly to a device for cleaning such a detection system.

The function of the detection systems with which many motor vehicles are now equipped is to collect information on the environment of the motor vehicle, in particular in order to provide the driver with assistance in the driving and/or the maneuvering of this vehicle. To this end, the detection system is commonly installed on the vehicle in such a way as to collect information on the environment in front, on the environment to the rear and on the environment to the sides of the vehicle: the detection system is therefore conventionally installed on the front face and/or on the rear face and/or on a rearview mirror of the vehicle.

Such locations are however particularly exposed to the fouling as from dirty water, dust or other types of sprays. Now, such fouling forms an obstacle to the emission and the reception of the information and can disrupt the operation of the detection system, even make this operation impossible.

More recently, the aim has been to equip the motor vehicles with laser detection systems which target the road scene upstream of the vehicle to analyze whether obstacles risk being of accident potential and provide the avoidance and/or emergency braking maneuvers to be provided accordingly. The demand for the optical surface of these detection systems to be clean is as previously described.

Moreover, the optical surfaces of the detectors of such laser detection systems are generally of complex form, and they comprise in particular a zone of emission of a detection system and a zone of reception of this signal. It is therefore important for the device implemented to clean this optical surface to allow the injection of one or more cleaning and/or drying fluids over a large surface corresponding to the wide field of detection of the detector used in the detection system (for example a laser detector).

Such cleaning devices comprise, as is known, at least one body for conveying cleaning and/or drying fluid(s) which is coupled, at its upstream end, to a fluid(s) storage assembly and which is coupled, at its downstream end, to a delivery manifold in which is arranged a set of dispensing orifices through which the fluid or fluids are sprayed onto the optical surface to be cleaned. The upstream end and the downstream end are defined relative to the fluid conveyance direction.

The form and the dimension of the boom can vary depending on the optical surface to be cleaned. It will thus be possible to provide a longer or shorter boom, in the direction transversal to the direction of extension of the conveying body, to provide an appropriate number of dispensing orifices, and/or provide a more or less straight boom in order to adapt the curvature of the optical surface.

In order to optimize the production costs, it is advantageous for one and the same conveying body to be able to receive the greatest possible variety of delivery manifold s. The aim is therefore to have conveying bodies and delivery manifold s that are simple to produce, and which can be easily assembled tightly, reproducibly and quickly.

Another problem solved by the present invention is to make the angular mounting of the delivery manifold relative to the optical surface of the detector reliable. The aim of the invention is to propose a compact cleaning device and a delivery manifold which is perfectly and geometrically adapted to the optical surface of the detector. Indeed, one of the aims of the invention is to be able to change and mount the delivery manifold as many times as the user wants while always having the same angles of spraying of the fluid toward the optical surface of the detector.

The aim of the invention is to propose a compact cleaning device, which allows for effective cleaning of all of the optical surface concerned, and which can be assembled simply and reproducibly.

To this end, the subject of the invention is a cleaning device, intended to spray at least one fluid toward a surface to be cleaned of a motor vehicle, such as an optical surface of a sensor of an optical detection system, said cleaning device comprising at least one conveying body and a delivery manifold for one or more cleaning and/or drying fluids, and means for attaching a coupling portion of the delivery manifold to an end of the conveying body, characterized in that the attachment means comprise an elastic interlocking assembly and a foolproofing assembly formed respectively by elements borne by the conveying body and complementary elements borne by the delivery manifold.

The conveying body can have a generally elongate form in a longitudinal direction, and it is coupled, at its upstream end, to a cleaning and/or drying fluids storage and supply assembly. At its downstream end, opposite its upstream end, it is attached to the delivery manifold via the abovementioned attachment means. According to a particular embodiment of the invention, the conveying body has a substantially cylindrical form.

Provision can be made for the conveying body to comprise a piston, which can also have a substantially cylindrical form, pierced by a conveying channel through which the cleaning and/or drying fluid or fluids are brought to a set of dispensing ducts arranged in the delivery manifold. This set of dispensing ducts comprises at least one dispensing channel in which are arranged a plurality of dispensing orifices through which the cleaning and/or drying fluid or fluids are sprayed onto the optical surface of the detector of the detection system.

In order to allow for a distribution that is as uniform as possible of the cleaning and/or drying fluids over all of the optical surface to be cleaned, the dispensing channel, and, thereby, the delivery manifold, advantageously extends on either side in a generally transverse direction, of the coupling portion by which this delivery manifold is attached to the downstream end of the conveying body. According to a particular embodiment of the invention, the dispensing channel extends substantially symmetrically, in this generally transverse direction, on either side of the coupling portion of the delivery manifold by which the latter is attached to the downstream end of the conveying body.

According to a feature of the invention, the elements forming the elastic interlocking assembly are configured in pairs to also perform a foolproofing function.

In particular, the elements forming the elastic interlocking assembly can comprise at least a first snug and a second snug arranged on the conveying body, and a first window and a second window arranged in a coupling portion of the delivery manifold, these elements being configured so that the first snug cooperates specifically with the first window and the second snug cooperates specifically with the second window.

The delivery manifold and the conveying body are thus assembled and locked to one another by snap-fitting of the first snug and of the second snug in the corresponding windows arranged in the coupling portion of the delivery manifold, the respective dimensions and forms of the delivery manifold and of the conveying body being defined so that the latter constitutes a male element that is inserted into the female element formed by the delivery manifold. Advantageously, to facilitate this insertion, the first snug and the second snug each have an inclined plane oriented toward the downstream end of the conveying body. According to a feature of the invention, the first snug and the second snug are offset relative to one another in the longitudinal direction of extension of the conveying body. The result thereof is, naturally, that the first window and the second window are also offset relative to one another in a direction substantially parallel to the longitudinal direction of extension of the conveying body and of the coupling portion of the delivery manifold, the coupling portion of the delivery manifold extending substantially in the same longitudinal direction as the conveying body.

According to an embodiment of the invention, the first snug and the second snug are arranged substantially symmetrically relative to a median plane of the assembly formed by the conveying body and the coupling portion of the delivery manifold, this median plane being defined by the longitudinal direction of extension of the conveying body and by the transverse direction of extension of the dispensing channel arranged in the delivery manifold. In other words, the snugs are diametrically opposite. The arrangement of the first and second snugs on the conveying body then means that the first window and the second window are advantageously arranged substantially symmetrically relative to the median plane previously defined in the coupling portion of the delivery manifold.

The first snug and the second snug can be arranged on the piston previously defined. Indeed, it is particularly advantageous to produce a cleaning device in which the delivery manifold is mobile so that the fluid sprayed through the dispensing orifices can reach all of the optical surface effectively and uniformly. For this, the piston, made secured to the delivery manifold by the abovementioned attachment means, for example can be made mobile between different positions corresponding to the various positions sought for delivery manifold and channel. The piston can be mobile, in its direction of longitudinal extension, between a position of rest and at least one working position in which it allows at least one cleaning and/or drying fluid to be dispensed by the delivery manifold. In this case, the respective forms and dimensions of the piston and of the delivery manifold are defined so that it is the piston which forms the male element that is inserted into the female element formed by the coupling portion of the delivery manifold by which the latter is then attached to said piston.

According to another feature of the invention, the means for attaching the delivery manifold to the conveying body comprise at least one positioning finger arranged on the conveying body or on the piston. According to different features, taken separately or in combination:

this positioning finger is arranged in a substantially longitudinal direction, this positioning finger is arranged in the vicinity of the downstream end of the conveying body, this positioning finger is arranged in the vicinity of the downstream end of the piston, this positioning finger is configured to be placed, when the delivery manifold is assembled with the conveying body, in abutment at the bottom of a notch arranged in the coupling portion of said delivery manifold, this positioning finger is substantially aligned in the longitudinal direction of extension of the conveying body, with the first snug and/or with the second snug, the notch arranged in the coupling portion of the delivery manifold to receive a corresponding positioning finger is substantially aligned, in the longitudinal direction of extension of the conveying body and of the coupling portion of the delivery manifold, with the first window or with the second window previously defined, the conveying body comprises a shoulder configured to bearingly receive the thickness of the coupling portion of the delivery manifold, this positioning finger is arranged on the piston.

It is in particular possible to provide two positioning fingers, for example diametrically opposite, which have dimensions and/or forms that are different from one positioning finger to the other, and/or also a longitudinal arrangement along the conveying body or the piston that differs from one to the other, and it is possible to provide, at the same time, an equivalent arrangement or dimensioning for the notches on the delivery manifold. The positioning fingers and the notches then perform, in addition to an angular indexing function, a foolproofing function.

Advantageously, the shoulder from which the abovementioned extension extends is arranged over all of the periphery of the conveying body, and its dimensions are configured for it to bearingly receive the thickness of the coupling portion of the delivery manifold. Thus, the coupling portion of the delivery manifold forms, with the conveying body, a substantially continuous surface in their attachment zone. Advantageously, when the extension is produced on the piston, the shoulder is also arranged on this same piston.

The longitudinal offset of the first and second snugs and of the first and second windows, as well as the presence of the abovementioned extension, constitute foolproofing elements that make it possible to assemble the delivery manifold with the conveying body according to a predefined spatial orientation, in particular with respect to the median plane previously defined. It should also be noted that the cooperation of the first and second snugs with the first and second windows constitutes a means for longitudinally blocking the delivery manifold relative to the conveying body.

The placement of such foolproofing elements offers a particularly advantageous advantage in the case of a device intended to clean a curved optical surface. In effect, as stated previously, it is important for the cleaning device to allow cleaning/drying fluid to be sprayed over all of the optical surface of the detection system, in particular to ensure a uniform cleaning of the zone of emission and of the zone of reception of the detector concerned. This can be obtained by the placement of a curved delivery manifold, for example whose curvature is substantially identical to a curvature of the optical surface or homothetic to such curvature. In this case it can be advantageous to produce the delivery manifold in two parts, arranged symmetrically when the delivery manifold is attached to the conveying body, on either side of the abovementioned median plane, and fixed together, for example by welding. Such an arrangement makes it possible to simplify the production of such a boom, each of the constituent parts being able to be easily produced by the injection of an appropriate polymer material into a mold.

According to a feature of the invention, the delivery manifold can be produced as a first part and a second part that are welded to one another, each part having, symmetrically, elements of the elastic interlocking assembly and elements of the foolproofing assembly.

In this context, the parts of the delivery manifold are fixed to one another by a substantially median surface containing, respectively, the axis of longitudinal extension of the coupling portion of said delivery manifold, and the axes of a dispensing channel, of a main distribution channel and of at least one auxiliary distribution channel arranged in said delivery manifold to convey the cleaning and/or drying fluid or fluids to a set of dispensing orifices intended to spray this or these fluid(s) onto the optical surface to be cleaned.

Moreover, for bulk reasons, the device for cleaning a detection system for a motor vehicle is generally fixed onto a housing for receiving a detector of this detection system. It is therefore crucially important, when the optical surface considered is curved, for the fixing of the assembly formed by the conveying body and the delivery manifold onto the detector reception housing to be made simply with a predefined orientation, in particular with respect to said optical surface. Since the delivery manifold and the conveying body are generally preassembled before being installed on the detection system reception housing, it is therefore important to have simple and reproducible means making it possible to produce the spatial orientation sought. The foolproofing elements proposed by the invention then make it possible to achieve such orientation simply and reproducibly.

According to another feature, the means for attaching the delivery manifold to the conveying body of the cleaning device according to the invention also comprise at least one lateral appendage of substantially longitudinal extension, arranged on the conveying body, and configured to be inserted into a substantially longitudinal slit arranged in the delivery manifold.

According to different features, taken separately or in combination, of one or more particular embodiments of the invention:
  two lateral appendages are arranged on the conveying body,
  the two lateral appendages are substantially symmetrically arranged relative to a second longitudinal median plane substantially at right angles to the first, transverse longitudinal median plane previously described,
  the two lateral appendages extend longitudinally toward the downstream end of the conveying body, from the shoulder previously defined,
  on a straight section of the conveying body, the two lateral appendages are arranged substantially at 90 degrees relative to the first and second snugs,
  the two lateral appendages are arranged on the piston.

These lateral appendages constitute, upon the assembly of the delivery manifold with the conveying body, a means for guiding and blocking these two elements together. In effect, the length of these lateral appendages and their insertion into slits of corresponding lengths arranged in the coupling portion of the delivery manifold produce a longitudinal guiding of the boom upon the insertion of the conveying body or of the piston within it. Moreover, once the delivery manifold and body or piston are assembled, the cooperation of the lateral appendages and of the corresponding slits forms a relative rotational blocking of the delivery manifold relative to the body or to the piston.

The invention thus proposes a cleaning device in which the assembly of the delivery manifold and of the conveying body (whether it be the conveying body itself or the constituent element of this conveying body formed by the piston) can be performed simply and reproducibly, without the risk of spatial orientation error of the delivery manifold with respect to the conveying body with a view to the subsequent installation of the assembly formed by these two elements on a housing receiving a detector of a detection system of a motor vehicle. The means proposed by the invention also make it possible to produce a blocking of the delivery manifold and of the conveying body relative to one another in two directions that are substantially at right angles to one another, augmenting the reliability of the assembly of these two elements together.

The invention also relates to a detection system intended for a motor vehicle, comprising at least one detector accommodated in a reception housing and at least one cleaning device, as has just been described previously, for the cleaning of an optical surface of said detector. The cleaning device can in particular be fixed onto the detector reception housing.

The invention relates also to a motor vehicle equipped with a detection system as has just been presented.

Figure 4:
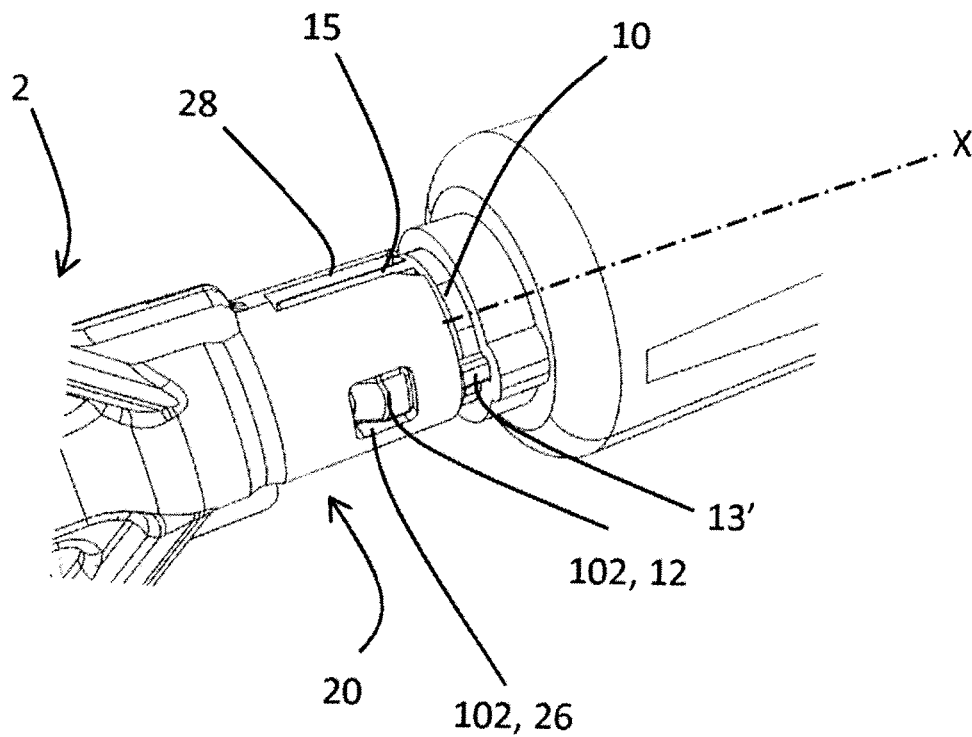
Figure 5:
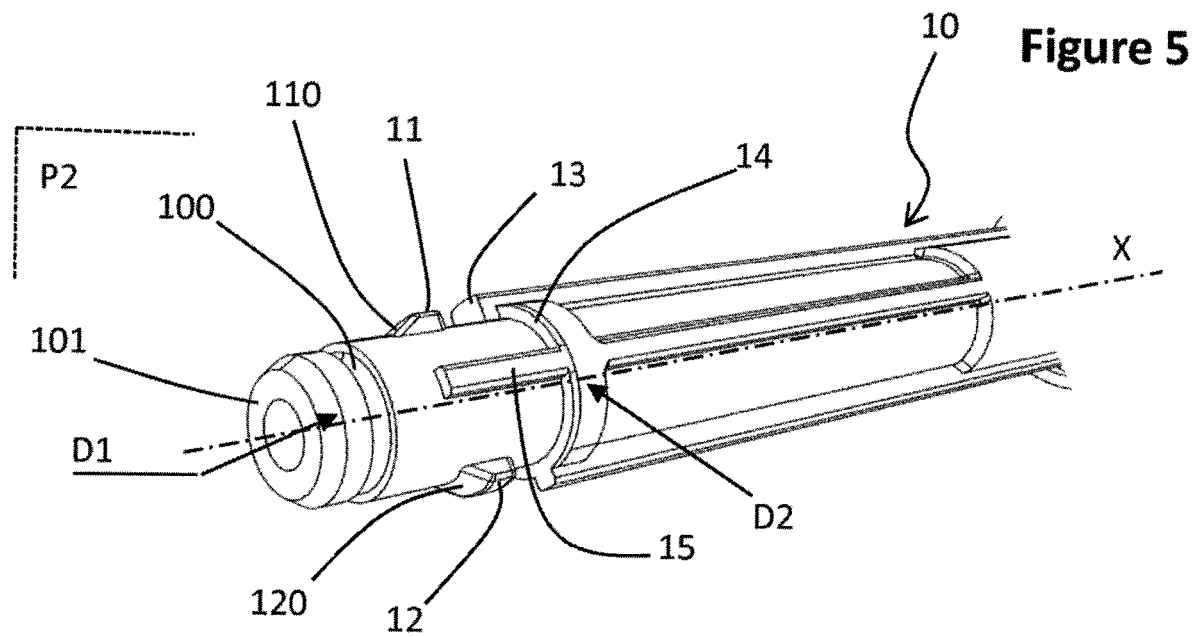
Figure 8:
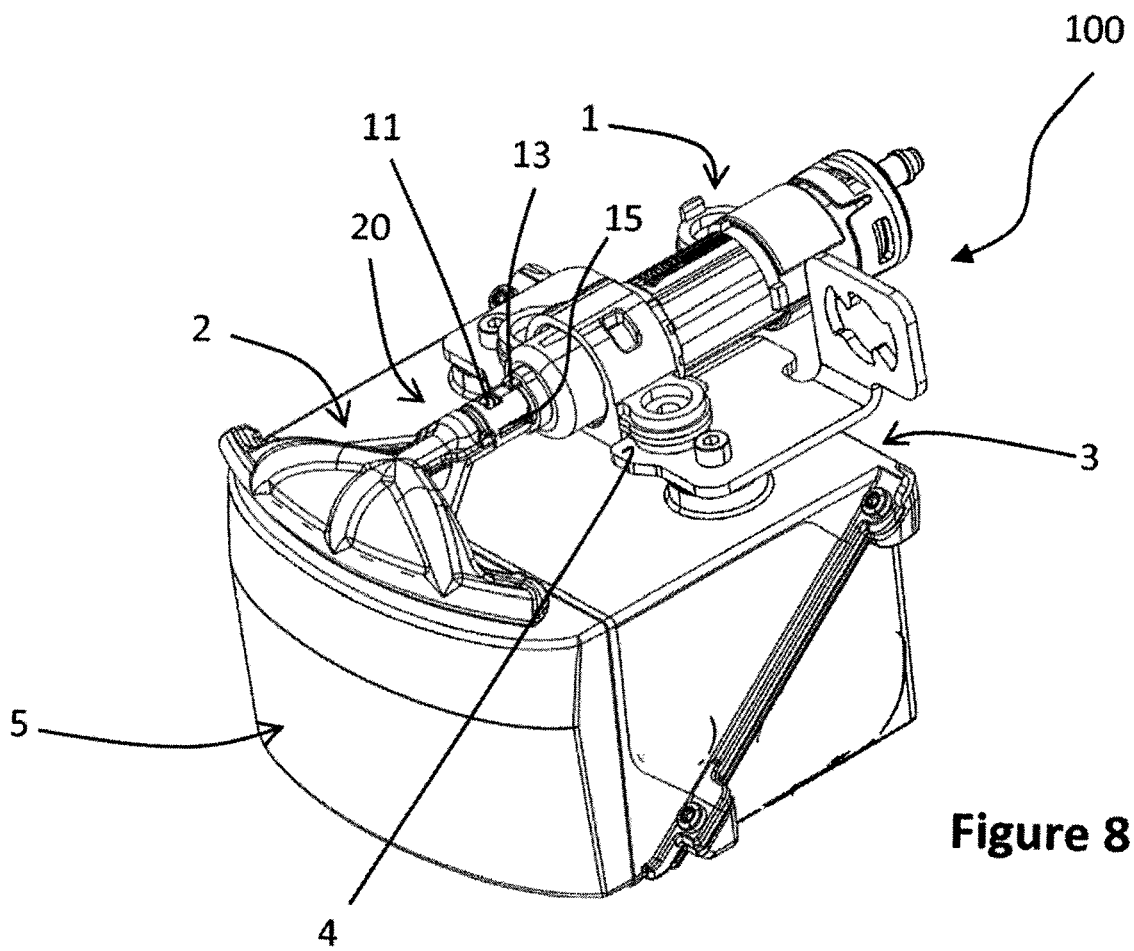
Figure 9:
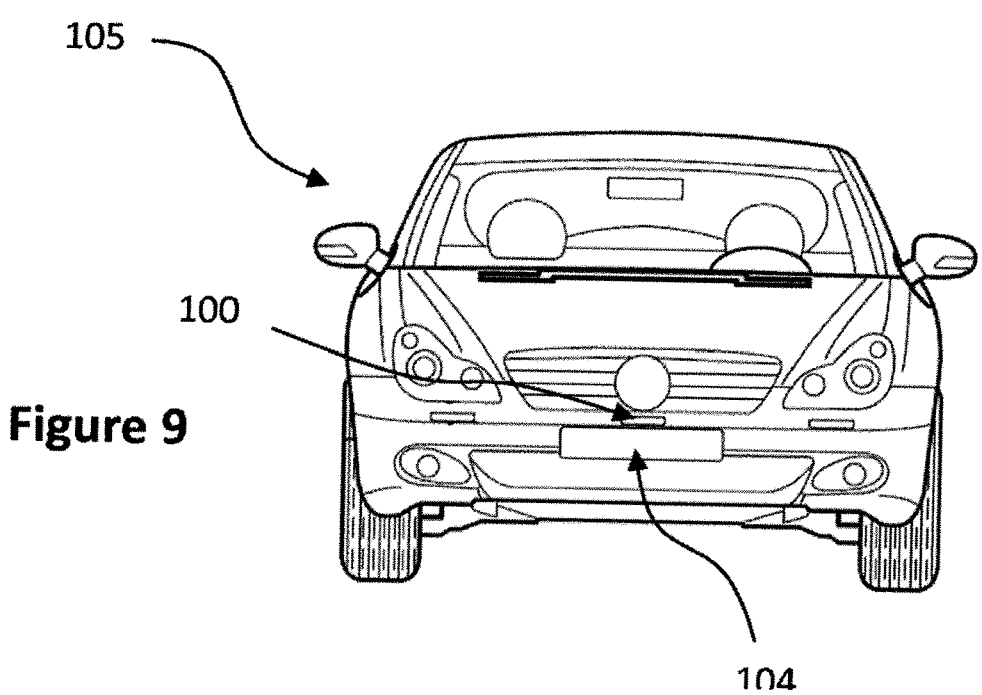

Other features, details and advantages of the invention and of its operation will emerge more clearly on reading the description given hereinbelow by way of indication, in relation to the attached figures, in which:

FIG. 1 is a perspective schematic view of the delivery manifold and of the conveying body of a cleaning device according to a particular embodiment of the invention, FIG. 2 is a detail view of the zone by which the delivery manifold is attached to the conveying body and the attachment means of a device according to the invention such as that illustrated by FIG. 1, FIG. 3 illustrates the device of FIG. 1, with a perspective view from a viewing angle other than that of FIG. 1, FIG. 4 is a detail view of the zone represented in FIG. 2, from the same viewing angle as that presented by FIG. 3, FIG. 5 is a perspective schematic view of a piston configured to lodge in the conveying body of the device illustrated by FIGS. 1 to 4, FIGS. 5a and 5b are side and front views of the downstream end of the piston of FIG. 5, FIGS. 6a and 6b are perspective schematic views of the two parts of a delivery manifold according to a particular embodiment of the invention, FIGS. 7a and 7b are detail views of the attachment means borne by the two boom parts illustrated respectively by FIGS. 6a and 6b, FIG. 8 shows a schematic view of a detection system for a motor vehicle equipped with the cleaning device of FIG. 1, and FIG. 9 is a front view of a motor vehicle, whose front face is equipped with an optical detection system and an associated cleaning device according to the invention.

It should first of all be noted that while the figures explain the invention in detail for its implementation, they can of course be used to better define the invention as necessary. Likewise, it should be recalled that, for all of the figures, the same elements are designated by the same references.

It should also be noted that, in the following description, the designations "upstream" and "downstream" refer to the direction of flow of the fluids whether they are cleaning or drying fluids, in the cleaning device according to the invention. Thus, the designation "upstream" refers to the side of the device according to the invention through which these fluids are admitted into it, and the designation "downstream" refers to the side of the device according to the invention through which the fluids are dispensed out of it, in particular toward an optical surface of a detection system of a motor vehicle.

Referring to the different figures, the cleaning device 100 comprises a hollow conveying body 1 which extends in a direction of longitudinal extension X: according to the particular embodiment of the invention illustrated by the figures, the conveying body 1 has a substantially cylindrical form of axis X. The conveying body 1 forms a cylinder in which is housed a piston 10, visible on its own in FIG. 5. The piston 10 and the conveying body 1 are advantageously coaxial of axis X: according to the embodiment more particularly illustrated by the figures, these two elements have a form that is generally substantially cylindrical, of axis of revolution X.

The conveying body 1 has at its upstream end 6 an intake end-fitting 7 through which the fluid is injected into the conveying body, from storage tank(s) arranged otherwise.

At its downstream end 8, opposite the fluid intake, the conveying body 1 is attached to a delivery manifold 2: more specifically, according to the embodiment more particularly illustrated by the figures, the delivery manifold is attached to the free end of the piston 10, that is to say, here again, the downstream end of the piston.

The piston 10 is pierced by at least one conveying channel 10' (visible in FIG. 5) which emerges, at the downstream end of the piston 10, substantially coaxially with the axis X.

The delivery manifold 2 comprises a coupling portion 20, by which it is attached to the downstream end of the conveying body 1 or of the piston 10, and a transverse dispensing portion 29. According to the embodiment more particularly illustrated by the figures, this coupling portion 20 is substantially cylindrical, of axis X, and its dimensions and forms are defined so that it constitutes a female element into which the free end of the piston 10 is inserted.

In its transverse dispensing portion 29, the delivery manifold 2 comprises a dispensing channel 21 in which are arranged several dispensing orifices 22 (visible in FIG. 3) through which one or more cleaning and/or drying fluids are sprayed toward an optical surface 5 of the detector of the detection system (visible in FIG. 8).

In order to allow the cleaning of an optical surface 5 having a wide visual field, the dispensing channel 21 extends transversely on either side of the longitudinal axis X of extension of the conveying body. According to the embodiment more particularly illustrated by the figures, the dispensing channel 21 extends substantially symmetrically on either side of the longitudinal axis X in a generally transverse direction Y. According to this particular embodiment, the delivery manifold 2 comprises a main distribution channel 23 which extends substantially in the longitudinal extension of the piston 10, and two auxiliary distribution channels 24 symmetrically arranged on either side of the main distribution channel 23. Advantageously, the main distribution channel 23 longitudinally extends the conveying channel 10' with which it is tightly connected, in particular through the presence of a seal (not visible in the figures) inserted into a groove 10" (visible in FIG. 5) arranged at the downstream end of the piston 10 and which is compressed by the fitting of the delivery manifold around the free end of the piston 10.

In the cleaning device 100 according to the invention, the delivery manifold 2 is fixed onto the conveying body 1 by attachment means 101 which comprise, on the one hand, an elastic interlocking assembly 102 and, on the other hand, a foolproofing assembly 103, respectively comprising elements arranged in complementary fashion between the boom and the conveying body. As will be described hereinbelow, the presence of elastic interlocking elements allows for a fast and reliable fitting, and simple dismantling, of the delivery manifold, and the complementary presence of foolproofing elements makes it possible to avoid a mounting of the delivery manifold in a direction inappropriate to the dispensing of fluid(s) onto the optical surface to be cleaned.

According to the embodiment of the invention more particularly illustrated by the figures, the attachment of the delivery manifold 2 to the conveying body 1 is made via the piston 10, at the free end thereof. In other words, according to the embodiment of the invention more particularly illustrated by the figures, the means for attaching the delivery manifold 2 to the conveying body are borne in complementary fashion by the delivery manifold 2, in particular in its coupling portion 20, and by the piston 10. This embodiment is particularly advantageous in the most commonplace case where the piston 10 is telescopic, that is to say mobile between a position of rest in which no fluid is dispensed and at least one working position in which it allows the dispensing of cleaning and/or drying fluid through the delivery manifold 2. Such a telescopic deployment of the piston 10, along the direction of longitudinal extension X of the conveying body 1, allows the delivery manifold 2 to take different positions relative to the optical surface 5 to be cleaned, in order to perform an optimal cleaning thereof.

The attachment means 101 as come to be presented, that is to say formed by an elastic interlocking assembly 102 and a foolproofing assembly 103, will now be described in more detail.

The elastic interlocking assembly 102 comprises elements of complementary form produced for some of them on the pinion 10 and for the others on the delivery manifold 2.

The elements of the elastic interlocking assembly borne by the pinion 10 here take the form of a first snug 11 and of a second snug 12 which extend from the outer peripheral surface of the piston 10, in a substantially radial direction therefrom, and the elements of the elastic interlocking assembly borne by the delivery manifold 2 here take the form of a first window 25 and of a second window 26 arranged in the coupling portion 20.

In the assembly of the piston 10 with the coupling portion 20 of the delivery manifold 2, the first snug 11 is configured to be inserted into the first window 25, and the second snug 12 is configured to be inserted at the same time into the second window 26.

The first snug 11 and the second snug 12 each have an inclined plane, respectively 110 and 120. The function of these inclined planes is to facilitate the insertion of the first snug 11 and of the second snug 12 respectively into the first window 25 and into the second window 26 upon the assembly of the delivery manifold 2 with the piston 10. To this end, the inclined planes are produced on the face of the corresponding snug oriented toward the downstream end of the piston 10, that is to say away from the conveying body 1, such that it is the inclined plane 110, 120 which is the first to come into contact with the coupling portion upon the assembly of the piston 10 with the delivery manifold 2. A progressive separation of the connection portion is thus permitted to allow passage for the snugs, until the latter take position in the windows provided for this purpose and the connection portion reverts to its initial form. On the face of the snug oriented upstream of the piston, that is to say the face opposite that bearing the inclined plane, the snug 11, 12 has a straight face, substantially at right angles to the peripheral wall of the connection portion 20, which offers an abutment opposing release when the snug is housed in the corresponding window.

In other words, the delivery manifold 2 and the piston 10 are thus locked together by respective snap-fitting of the first snug 11 in the first window 25 and of the second snug 12 in the second window 26.

According to the embodiment more particularly illustrated by the figures, the first snug 11 and the second snug 12 are substantially diametrically opposite on the piston 10. More specifically, they are substantially diametrically opposite relative to a substantially longitudinal transverse median plane P1 that is defined, when the delivery manifold 2 and the conveying body 1 are assembled, by the direction of the axis X of extension of the piston 10 and of the coupling portion 20 of the delivery manifold 2 and by the transverse direction Y of extension of the dispensing channel 21 of the delivery manifold 2 on either side of the coupling portion 20.

Moreover, these snap-fitting elements also participate in the foolproofing function which makes it possible to ensure that the delivery manifold is elastically fitted in the right direction relative to the conveying body, and in particular that the dispensing orifices are correctly oriented toward the surface to be cleaned when the cleaning device is fixed in the vicinity of this surface to be cleaned.

Figure 5A:
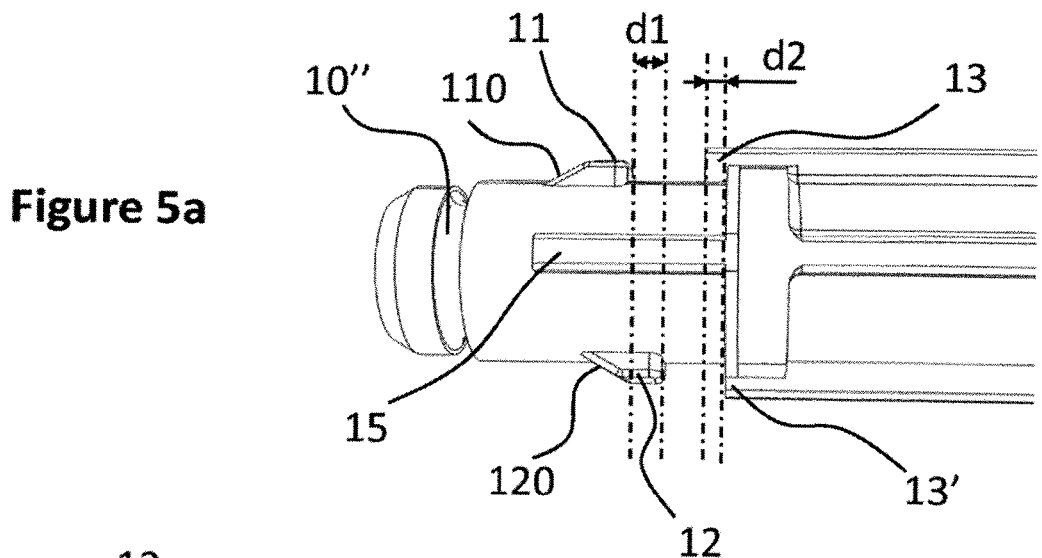
Figure 5B:
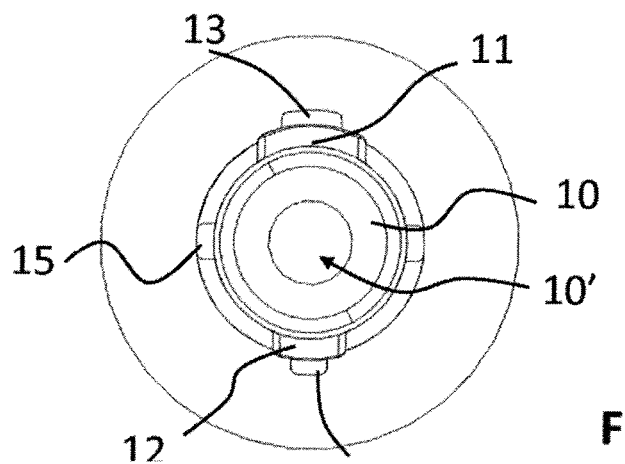

Thus, the first snug 11 and the second snug 12 are longitudinally offset on the piston 10, as may be visible in FIG. 5, and more clearly in FIG. 5a. In other words, the first snug 11 and the second snug 12 are offset, in the longitudinal direction of the axis X, by a distance d1. As a nonlimiting example, the distance d1 is advantageously of the order of a few tenths of a millimeter to a few millimeters. Although not visible in the figures, it is understood that the first window 25 and the second window 26 are also offset relative to one another, in the longitudinal direction X, by a distance substantially equal to the distance of longitudinal separation d1 between the first snug 11 and the second snug 12. The result of this particular arrangement is that the delivery manifold cannot be elastically fitted correctly, only in a given direction, with the window and the corresponding snug facing one another.

In a complementary manner, and as the figures show, the invention can provide for one of these snugs (here, the first snug 11, according to the embodiment more particularly illustrated by the figures) to extend over an angular segment of the piston 10 that is smaller than the other snug (here the second snug 12). The same dimensions of the snugs and, consequently, of the corresponding windows arranged in the delivery manifold 2 then constitute a complementary foolproofing element in the assembly of the delivery manifold 2 with the piston 10.

A shoulder 14 is formed on the periphery of the piston 10. Advantageously, the shoulder 14 is arranged over all of the periphery of the piston 10, and its radial dimension is substantially equal to the thickness of the coupling portion 20 of the delivery manifold 2. In other words, the piston 10 has, from its downstream end by which it is attached to the delivery manifold 2, and toward its upstream end, in the longitudinal direction of the axis X, a first diameter D1 defined to allow its insertion into the substantially cylindrical coupling portion 20 of the delivery manifold 2, then a second diameter D2, greater than the first diameter D1, defined by the radial dimension of the shoulder 14. The first snug 11 and the second snug 12 are arranged on the first diameter part D1 of the piston 10, so that, upon the insertion of the latter into the substantially cylindrical coupling portion 20 of the delivery manifold 2, they can produce the locking by snap-fitting by cooperation respectively with the first window 25 and with the second window 26. The coupling portion 20 of the delivery manifold 2 and the piston 10 thus form a substantially continuous surface whose outer diameter is substantially equal to the second diameter D2 previously defined.

Positioning fingers 13, 13' are arranged protruding from the piston 10, diametrically opposite and respectively in the radial extension of the shoulder 14. At least one of the positioning fingers 13 is configured to be inserted into a notch 27 arranged in the upstream end edge of the coupling portion 20 of the delivery manifold. According to the embodiment more particularly illustrated by the figures, each positioning finger 13, 13' is longitudinally substantially aligned with one of the snugs and it follows therefrom that the corresponding notch 27 is, on the delivery manifold 2, substantially longitudinally aligned with one of the windows. It should be noted that these positioning fingers have different dimensions, a first positioning finger 13 being narrower than the second, diametrically opposite positioning finger 13', and that they can extend longitudinally over different reaches, with in particular a longitudinal offset of their downstream end face equal to a distance d2, visible in FIG. 5b.

It is understood that the positioning fingers 13 form foolproofing elements associated with the piston 10 and therefore with the conveying body 1 and that the notches form complementary foolproofing elements associated with the delivery manifold, and it is understood that the fingers and the notches form a foolproofing assembly 103 distinct from the elastic interlocking assembly 102 previously described. In the example illustrated, a single notch 27 is provided and the positioning fingers have different dimensions such that a single positioning finger 13 can penetrate into the notch, which ensures the foolproofing function. It will be understood that, without departing from the context of the invention, it will be possible to provide two notches, diametrically opposite and dimensioned so as to be able to cooperate only with a specific positioning finger.

Upon the assembly of the delivery manifold on the conveying body, the respective dimensions of the substantially cylindrical coupling portion 20 of the delivery manifold 2, of the notches 27, of the shoulder 14 and of the positioning fingers 13 are defined, according to the invention, so that, once the first and second snugs, respectively 11 and 12, are engaged in the corresponding windows, respectively 25 and 26, at least one positioning finger 13 is engaged in abutment against the bottom of a notch 27, and so that the thickness of the substantially cylindrical coupling portion 20 of the delivery manifold 2 is bearing against the shoulder 14.

The means for attaching the delivery manifold 2 to the conveying body 1 thus comprise different foolproofing means, including the foolproofing assembly 103, specifically dedicated to this function, formed by the cooperation of the positioning fingers 13, 13' and one or more notches of complementary form and dimensions 27 and the elastic interlocking assembly 102 in which a particular arrangement of each of the snugs and of the complementary windows makes it possible to also ensure a foolproofing function. These foolproofing elements are of particular benefit in the case of an embodiment of the delivery manifold 2 as illustrated in particular in FIG. 8. Generally, a cleaning device according to the invention, intended for a detection system 104 of a motor vehicle 105, as illustrated in FIG. 9, is fixed onto a reception housing 3 of a detector of such a detection system, the delivery manifold 2 and the piston 10 (or the conveying body 1 depending on the embodiment chosen) being previously assembled prior to the installation of the cleaning device on said reception housing 3. According to the example illustrated by FIG. 8, the detector of the detection system comprises a curved optical surface 5. It is therefore particularly advantageous for the delivery manifold 2 or, more specifically, the dispensing channel 21, to have a curved geometry allowing an optimal cleaning of all of the detection field covered by the optical surface 5. It is therefore important, at the time of assembly of the delivery manifold 2 with the piston 10, to respect a predefined relative spatial orientation between the delivery manifold 2 and the optical surface 5, a relative orientation defined by the desired relative orientation of the delivery manifold 2 and of the dispensing orifices 22 that it bears relative to the optical surface 5 to be cleaned. The foolproofing elements formed by the first snug 11, the second snug 12, the corresponding first and second windows, respectively 25 and 26, and the positioning fingers 13, 13' and the complementary notch or notches 27 make it possible to perform the assembly according to such a spatial orientation reproducibly and without the risk of error.

The piston 10 can comprise at least one lateral appendage which extends, in a longitudinal direction substantially parallel to that of the longitudinal axis X of said piston 10, toward the downstream end of the latter from the shoulder 14 previously defined. Such a lateral appendage 15 therefore extends over the part of the piston 10 of first diameter D1 previously defined. According to the invention, this lateral appendage 15 is configured to be inserted, when the delivery manifold 2 is assembled with the piston 10, into a complementary slit 28 arranged in the substantially cylindrical coupling portion 20 of said delivery manifold 2.

According to the embodiment more particularly illustrated by the figures, two lateral appendages 15 are arranged on the piston 10, each extending radially from the piston 10. In complementary fashion, two complementary slits 28 are arranged in the substantially cylindrical coupling portion 20 of the delivery manifold 2. According to this particular embodiment, the two lateral appendages 15 are diametrically opposite on the piston 10, and their radial dimension is substantially equal to the difference between the second diameter D2 and the first diameter D1 previously defined. The result of the above is that the radial dimension of each of the lateral appendages 15 is substantially equal to the radial dimension of the shoulder 14 previously defined. According to the embodiment of the invention more particularly illustrated by the figures, the radial appendages 15 are arranged, at the periphery of the piston 10, substantially at 90 degrees from the first snug 11 and from the second snug 12 according to a transverse section of the piston 10. More specifically, according to a particular embodiment in which the device according to the invention comprises two appendages 15, the latter are advantageously arranged substantially symmetrically relative to a median longitudinal plane P2 substantially at right angles to the longitudinal transverse median plane P1 previously defined.

The cooperation of the lateral appendages 15 with the corresponding slits 28 arranged in the delivery manifold 2 ensures a form of longitudinal guidance of the latter upon its assembly with the piston 10, as well as a rotational blocking of the duly produced assembly.

As illustrated in FIGS. 6a, 6b and 7a, 7b, it is possible to provide for the delivery manifold 2 to be produced in two parts, namely a first part 2a and a second part 2b separated substantially by a median surface S (not represented in the figures) and assembled together for example by welding. Such production makes it possible to reduce the production costs, each part of the delivery manifold 2 being able to be easily produced by injection, into a mold, of an appropriate polymer material, and the two parts of the delivery manifold 2 then being assembled, for example by welding.

More specifically, according to this particular embodiment, the substantially cylindrical coupling portion 20 of the delivery manifold 2 is formed as a first part 20a and a second part 20b, and the same goes for the dispensing channel 21, formed as a first part 21a and a second part 21b, for the main distribution channel 23, formed as a first part 23a and a second part 23b, for the auxiliary distribution channels 24, formed as a first part 24a and a second part 24b, and for the slits 28, formed as a first part 28a and a second part 28b. The substantially median surface S advantageously contains the longitudinal axis X of the substantially cylindrical coupling portion 20 of the delivery manifold 2, as well as the axes (not represented in the figures) respectively of the dispensing channel 21, of the main distribution channel 23 and of the auxiliary distribution channels 24.

The invention thus makes it possible to produce a cleaning device in which the fluid(s) delivery manifold and the conveying body for this (these) fluid(s), and in particular the piston in the case of a telescopic cleaning device, can be assembled simply, reproducibly, and without error according to a predefined relative spatial orientation relative to one another and with respect to fixing elements 4 of the assembly that they form on a reception housing 3 of a detector of a detection system of a motor vehicle.

The invention should not however be limited to the means and configurations described and illustrated, and it applies equally to all equivalent means or configurations and to any combination of such means. In particular, while the invention has been described here in an embodiment in which the general geometry of the conveying body and of the piston is a cylindrical geometry, it goes without saying that the invention applies to any type of geometry and of forms, insofar as the elements producing the different functionalities described here are present. Likewise, while the invention is described here in an embodiment in which the attachment means for the delivery manifold and for the conveying body are borne by the piston, it applies equally to the case where these attachment means are borne by another element of the conveying body, for example in the case where the cleaning device would be fixed relative to the optical surface to be cleaned.

The invention claimed is:

1. A cleaning device to spray at least one fluid toward a surface to be cleaned of a motor vehicle comprising an optical surface of a sensor of an optical detection system, said cleaning device comprising:
   at least one conveying body and a delivery manifold for one or more cleaning and/or drying fluids; and
   means for attaching a coupling portion of the delivery manifold to an end of the conveying body,
   wherein the attachment means comprise an elastic interlocking assembly and a foolproofing assembly formed respectively by elements borne by the conveying body and complementary elements borne by the delivery manifold,
   wherein the elastic interlocking assembly and the foolproofing assembly are complementary assemblies jointly coupling the delivery manifold and the conveying body,
   wherein the elements forming the elastic interlocking assembly comprise at least a first snug and a second snug arranged on the conveying body and a first window and a second window arranged in the coupling portion of the delivery manifold, these elements being configured so that the first snug cooperates specifically with the first window and the second snug cooperates specifically with the second window, and
   wherein the elements forming the elastic interlocking assembly are configured in pairs to also perform a foolproofing function of the foolproofing assembly.

2. The cleaning device as claimed in claim 1, wherein the first snug and the second snug are offset relative to one another in a direction of longitudinal extension of the conveying body.

3. The cleaning device as claimed in claim 1, wherein the first snug and the second snug each have, oriented toward the downstream end of the conveying body, an inclined plane.

4. The cleaning device as claimed in claim 1, in which the conveying body comprises a piston, the first snug and the second snug are arranged on the piston.

5. The cleaning device as claimed in claim 1, wherein the foolproofing assembly comprises at least one positioning finger arranged on the conveying body.

6. The cleaning device as claimed in claim 5, wherein the positioning finger is configured to be placed, when the delivery manifold is assembled with the conveying body in abutment at the bottom of a notch arranged in the coupling portion of the delivery manifold.

7. The cleaning device as claimed in claim 5, wherein the positioning finger is longitudinally substantially aligned with one of the first or second snugs.

8. The cleaning device as claimed in claim 5, wherein the foolproofing assembly comprises two positioning fingers which have dimensions, and/or forms, and/or a longitudinal arrangement along the conveying body that are different from one positioning finger to the other.

9. The cleaning device as claimed in claim 1, in which the delivery manifold comprises at least one dispensing channel pierced by a set of orifices for dispensing one or more cleaning and/or drying fluids, wherein the dispensing channel extends transversely on either side of the coupling portion of the delivery manifold by which the latter is attached to the conveying body.

10. The cleaning device as claimed in claim 1, wherein the delivery manifold is produced as a first part and a second part that are welded to one another, each part having, symmetrically, elements of the elastic interlocking assembly and elements of the foolproofing assembly.

11. A detection system for a motor vehicle, comprising:
at least one detector accommodated in a reception housing; and
at least one device as claimed in claim 1 for the cleaning of an optical surface of said detector.

12. A motor vehicle equipped with a detection system as claimed in claim 11.

13. A cleaning device to spray at least one fluid toward a surface to be cleaned of a motor vehicle comprising an optical surface of a sensor of an optical detection system, said cleaning device comprising:
at least one conveying body and a delivery manifold for one or more cleaning and/or drying fluids; and
means for attaching a coupling portion of the delivery manifold to an end of the conveying body,
wherein the attachment means comprise an elastic interlocking assembly and a foolproofing assembly formed respectively by elements borne by the conveying body and complementary elements borne by the delivery manifold,
wherein the elastic interlocking assembly and the foolproofing assembly are complementary assemblies jointly coupling the delivery manifold and the conveying body,
wherein the foolproofing assembly comprises at least one positioning finger arranged on the conveying body, and
wherein the positioning finger extends in the vicinity of the downstream longitudinal end of the conveying body.

* * * * *